US011102087B2

(12) United States Patent
Gao et al.

(10) Patent No.: US 11,102,087 B2
(45) Date of Patent: Aug. 24, 2021

(54) SERVICE DEPLOYMENT FOR GEO-DISTRIBUTED EDGE CLOUDS

(71) Applicant: AT&T Intellectual Property I, L.P., Atlanta, GA (US)

(72) Inventors: Peixuan Gao, Brooklyn, NY (US); Michael Hwang, New Providence, NJ (US); Christopher Rath, Hillsborough, NJ (US); Rittwik Jana, Montville, NJ (US); Shu Shi, Summit, NJ (US); Varun Gupta, Morristown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/376,813

(22) Filed: Apr. 5, 2019

(65) Prior Publication Data
US 2020/0322233 A1  Oct. 8, 2020

(51) Int. Cl.
*H04L 12/24* (2006.01)
*H04L 29/08* (2006.01)
*H04L 12/26* (2006.01)
*H04W 88/18* (2009.01)
*H04W 24/04* (2009.01)

(52) U.S. Cl.
CPC ...... *H04L 41/5054* (2013.01); *H04L 41/5019* (2013.01); *H04L 43/0852* (2013.01); *H04L 67/16* (2013.01); *H04W 88/18* (2013.01); *H04W 24/04* (2013.01)

(58) Field of Classification Search
CPC ............. H04L 41/5054; H04L 41/5019; H04L 43/0852; H04L 67/16; H04W 88/18; H04W 24/04

USPC .......................................................... 455/414.1
See application file for complete search history.

(56) References Cited

U.S. PATENT DOCUMENTS

| | | | | |
|---|---|---|---|---|
| 7,624,448 | B2 * | 11/2009 | Coffman | G06F 21/552 726/22 |
| 9,317,336 | B2 * | 4/2016 | Alicherry | G06F 9/5077 |
| 10,110,495 | B1 * | 10/2018 | Sabella | H04L 12/1407 |
| 10,333,789 | B1 * | 6/2019 | Dippenaar | H04L 63/00 |
| 2017/0085488 | A1 * | 3/2017 | Bhattacharya | H04L 41/0806 |
| 2018/0183855 | A1 * | 6/2018 | Sabella | H04L 47/803 |
| 2019/0028552 | A1 * | 1/2019 | Johnson, II | H04L 67/146 |
| 2019/0042319 | A1 * | 2/2019 | Sood | H04W 12/08 |
| 2019/0104030 | A1 * | 4/2019 | Giust | G06F 9/5072 |
| 2019/0132222 | A1 * | 5/2019 | Son | H04L 47/805 |

(Continued)

*Primary Examiner* — Mong-Thuy T Tran

(57) ABSTRACT

A processing system including at least one processor may receive a request from a client device for a deployment of a client service to a mobile edge infrastructure of a telecommunication network, the mobile edge infrastructure including host devices, and determine at least one requirement for the client service, including at least one of: a distance requirement, comprising a maximum distance between the client device and a candidate host device for deploying the service, or a latency requirement, comprising a maximum latency between the client device and the candidate host device for deploying the service. The processing system may further determine at least one available host device of the mobile edge infrastructure that meets the requirements, select a host device from among the at least one available host device to run the client service, and instruct the client device to connect to the host device that is selected.

20 Claims, 3 Drawing Sheets

(56) References Cited

U.S. PATENT DOCUMENTS

2019/0141142 A1* 5/2019 Filippou .................. H04W 4/40
2019/0149408 A1* 5/2019 Li ....................... H04L 41/0806

* cited by examiner

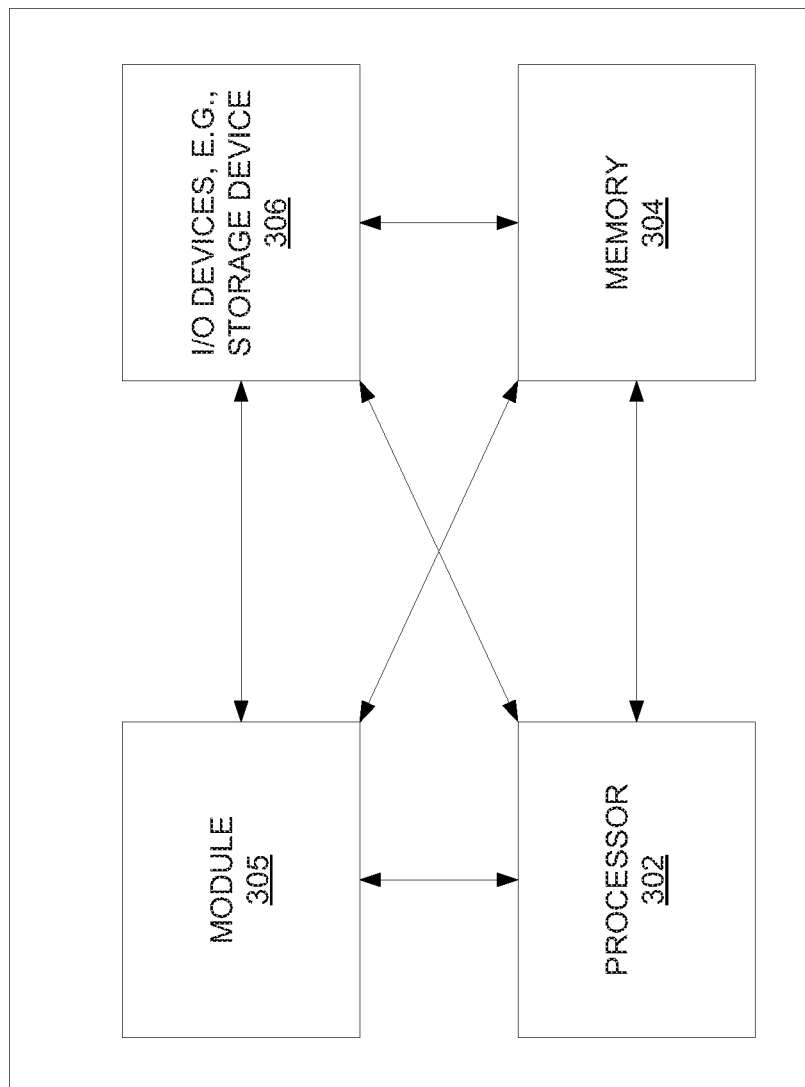

SERVICE DEPLOYMENT FOR GEO-DISTRIBUTED EDGE CLOUDS

The present disclosure relates generally to network edge computing, and more particularly to methods, computer-readable media, and apparatuses for selecting a host device of a mobile edge infrastructure of a telecommunication network to host a client service.

BACKGROUND

Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services. Different locations in the telecommunication network may be provisioned with appropriate amounts of network substrate, and to the extent possible, routers, switches, edge caches, middle-boxes, and the like, may be instantiated from the common resource pool. In addition, where the network edge has previously been well-defined, the advent of new devices and SDN architectures are pushing the edge closer and closer to the customer premises and to devices that customers use on a day-to-day basis.

SUMMARY

Methods, computer-readable media, and apparatuses for selecting a host device of a mobile edge infrastructure of a telecommunication network to host a client service are described. For example, a processing system including at least one processor may receive a request from a client device for a deployment of a client service to a mobile edge infrastructure of a telecommunication network, the mobile edge infrastructure including a plurality of host devices, and determine at least one requirement for the client service, the at least one requirement including at least one of: a distance requirement, comprising a maximum distance between the client device and a candidate host device for deploying the service, or a latency requirement, comprising a maximum latency between the client device and the candidate host device for deploying the service. The processing system may further determine at least one available host device of the plurality of host devices of the mobile edge infrastructure that meets the at least one requirement, select a host device from among the at least one available host device to run the client service, and instruct the client device to connect to the host device that is selected.

BRIEF DESCRIPTION OF THE DRAWINGS

The teachings of the present disclosure can be readily understood by considering the following detailed description in conjunction with the accompanying drawings, in which:

FIG. 3 illustrates a high level block diagram of a computing device specifically programmed to perform the steps, functions, blocks and/or operations described herein.

To facilitate understanding, identical reference numerals have been used, where possible, to designate identical elements that are common to the figures.

DETAILED DESCRIPTION

Figure 1:
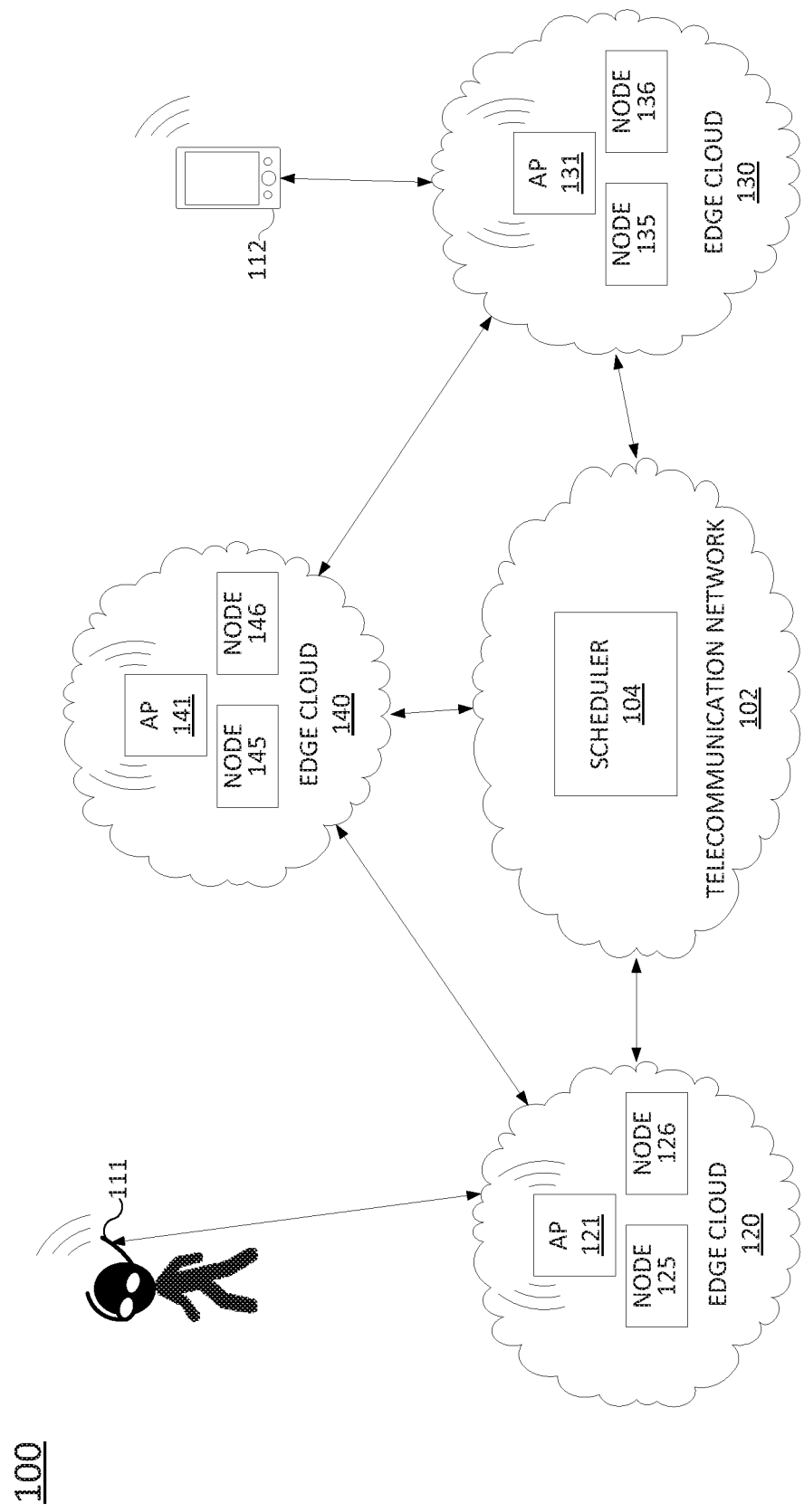
FIG. 1 illustrates an example network related to the present disclosure.

Examples of the present disclosure provide a service deployment platform over geo-distributed edge cloud resources, e.g., mobile edge infrastructure. In one example, the platform is an extensible resource manager to both track the diverse set of available resources in the edge cloud and to facilitate the deployment of services based upon various criteria. For instance, applications for autonomous vehicles, intelligent surveillance systems, and real-time virtual reality, and so forth demand strong backend computing resources and low-latency, high-bandwidth communication channels. The present platform allows users to offload resource-demanding computing components onto the edge clouds, reducing the workloads of the client devices. In addition, the edge sites are physically close to the end users, providing users with low-latency connections, e.g., within 20 ms, 5 ms, etc. With most of the computation done locally, the edge-enabled applications may also conserve radio access network bandwidth.

Edge computing has challenges that are unique to cloud computing. There are many compute sites, each with a different set of capabilities, resources, access, and availability. For example, a network may have 1000 or more compute sites. Unlike centralized cloud service deployments, resources may be more constrained and non-uniformly distributed. To illustrate, centralized cloud service deployment and resource management platforms may be focused on a single data center, rather than a large number of service locations, including network edge service locations.

In one example, the present disclosure includes a master node running in a central cloud (e.g., a centralized data center), and multiple agent nodes running in the geo-distributed edge clouds. The master node, acting as a central controller, monitors the resources in the edge clouds and facilitates the deployment of client services. The master node may comprise a scheduler, making deployment decisions for client services over edge clouds. The scheduler is flexible for different customized deployment strategies. In addition, agent nodes running on the edge cloud resources manage the resources and applications on the respective edge clouds. In accordance with the present disclosure, clients can customize deployment requirement and deploy the application over edge clouds on demand.

In one example, a workflow of the present disclosure may proceed as follows. First, a client device may send a service deployment request to the master node in the central cloud, including one or more customized deployment requirements. Next, the master node may query the agent nodes in the edge clouds for available deployment sites. Multiple available agent nodes may respond to the master node with offers indicating availability (or lack thereof) for service deployment. The scheduler may select a suitable agent node that fulfills the deployment requirement(s), and accept the offer. The master node may then deploy the client service at the selected agent node on the edge cloud, and provide the information of the selected agent node to the client device for service connection.

In one example, the present disclosure has at least one of two minimum requirements for service deployment: a distance requirement and/or a latency requirement. For instance, for the distance requirement, a client device may include with the request a location of the client device and a distance requirement comprising a minimum distance between the device and an agent node to which the client service may be deployed. Similarly, for the latency requirement, the client device may include with the request an Internet Protocol (IP) address or similar identifier of the client device, and a latency requirement comprising a minimum latency between the client device and an agent node to which the client service may be deployed. For instance, when receiving a deployment request with a latency requirement, the scheduler may request the agent nodes to measure the latency to the client device (e.g., pinging the client device) and provide the measurement results to the scheduler. The scheduler may then find an agent node that fulfills the latency requirement (and any other requirements for the client service).

In one example, the present disclosure provides a software development kit (SDK) for developers to create edge-optimized applications. Thus, users may enable edge cloud features and configure deployment requirements (broadly, at least one requirement), and automatically deploy applications over edge clouds on demand. Examples of the present disclosure may be used with any applications which are delay/latency sensitive and which may have high data/bandwidth requirements, such as streaming video, augmented reality, virtual reality, 360 video, volumetric video, video gaming, or other immersive visual streaming services (which may include audio streaming in addition to visual data), audio streaming services, virtual assistants, translation services, security services (e.g., object tracking, facial recognition, etc.), and so on. These and other aspects of the present disclosure are described in greater detail below in connection with the examples of FIGS. 1-3.

To further aid in understanding the present disclosure, FIG. 1 illustrates an example system 100 in which examples of the present disclosure for selecting a host device of a mobile edge infrastructure of a telecommunication network to host a client service may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a telecommunication network 102. The telecommunication network 102 may be in communication with one or more edge clouds 120, 130, and 140, and the Internet (not shown). In one example, telecommunication network 102 may combine core network components of a cellular network with components of a triple play service network; where triple-play services include telephone services, Internet services and television services to subscribers. For example, telecommunication network 102 may functionally comprise a fixed mobile convergence (FMC) network, e.g., an IP Multimedia Subsystem (IMS) network. In addition, telecommunication network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 102 may further comprise a broadcast television network, e.g., a traditional cable provider network or an Internet Protocol Television (IPTV) network, as well as an Internet Service Provider (ISP) network. In one example, telecommunication network 102 may include a plurality of television (TV) servers (e.g., a broadcast server, a cable head-end), a plurality of content servers, an advertising server (AS), an interactive TV/video on demand (VoD) server, and so forth. For ease of illustration, various additional elements of network 102 are omitted from FIG. 1.

In one example, the edge clouds 120, 130, and 140 may comprise access networks. For instance, in an illustrative example, edge clouds 120, 130, and 140 may comprise cellular/wireless access networks, e.g., radio access networks (RANs), such as a Universal Terrestrial Radio Access Network (UTRAN), an evolved UTRAN (eUTRAN), or the like. In such an example, the system 100 may comprise an LTE network, and the telecommunication network 102 may comprise an Evolved Packet Core (EPC) network, for instance. However, in other, further, and different examples, any one or more of the edge clouds 120, 130, or 140 may alternatively or additional comprise a Digital Subscriber Line (DSL) network, a broadband cable access network, a (non-cellular) wireless access networks (e.g., an Institute for Electrical and Electronics Engineers (IEEE) 802.11/Wi-Fi network and the like), and so forth. For example, the operator of telecommunication network 102 may provide a cable television service, an IPTV service, or any other types of telecommunication service to subscribers via the system 100.

In one example, the edge clouds 120, 130, and 140 may be in communication with one or more devices 111 and 112, e.g., "client devices." Edge clouds 120, 130, and 140 may transmit and receive communications between devices 111 and 112, between devices 111-112 and scheduler 104 or other components of telecommunication network 102, between devices 111-112 and nodes 125, 126, 135, 136, 145, and 146 (e.g., agent nodes, or host devices, as described in greater detail below), devices reachable via the Internet in general, and so forth. To illustrate, the edge clouds 120, 130, and 140 may comprise one or more access networks as described above. For instance, as illustrated in FIG. 1, each of the edge clouds 120, 130, and 140 may include at least one access point (AP), e.g., AP 121, AP 131, and AP 141, that may communicate wirelessly with devices 111 and 112 and that may interface with other devices in the respective edge clouds 120, 130, and 140, in the telecommunication network 102, over the Internet in general, and so on. Each of the APs 121, 131, and 141 may comprise a cellular base station, such as a base transceiver station (BTS), a NodeB or an evolved NodeB (eNodeB or eNB), a pico eNB (PeNB), e.g., of a pico cell, a home eNB (HeNB), e.g., of a femto cell, a non-cellular AP, e.g., a IEEE 802.11 wireless router/AP, and so on.

In one example, each of devices 111 and 112 may comprise any single device or combination of devices that may comprise a user endpoint device, or client device. For example, the devices 111 and 112 may each comprise a mobile device, a cellular smart phone, a laptop, a tablet computer, a desktop computer, an application server, a bank or cluster of such devices, and the like. In one example, devices 111 and 112 may comprise AR devices such as heads-up displays, wearable or non-wearable optical see-through or video see-through devices, handheld computing devices with at least a camera and a display, and so forth. For instance, as illustrated in FIG. 1, device 111 may comprise a wearable computing device (e.g., smart glasses, augmented reality glasses, a headset, or the like). Similarly, device 112 may comprise a tablet computer, a cellular smartphone, a non-cellular wireless device, or the like with at least a camera and a display.

In one example, devices 111 and 112 may each comprise programs, logic, or instructions for performing functions in connection with examples of the present disclosure for selecting a host device of a mobile edge infrastructure of a telecommunication network to host a client service. For example, devices 111 and 112 may each comprise a computing system or device, such as computing system 300 depicted in FIG. 3, and may be configured to provide one or more operations or functions in connection with examples of the present disclosure for selecting a host device of a mobile edge infrastructure of a telecommunication network to host a client service, as described herein.

As mentioned above, each of edge clouds 120, 130, and 140 may include a plurality of nodes, e.g., nodes 125, 126, 135, 136, 145, and 146. The nodes 125, 126, 135, 136, 145, and 146 may comprise host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the edge clouds 120, 130, and 140 comprise radio access networks, the nodes 125, 126, 135, 136, 145, and 146, and other components of the respective edge clouds 120, 130, and 140 may be referred to as mobile edge infrastructure. The nodes 125, 126, 135, 136, 145, and 146 may comprise servers hosting virtualization platforms for managing one or more virtual machines (VMs), containers, microservices, or the like.

In one example, the nodes 125, 126, 135, 136, 145, and 146 may comprise components of and/or be collocated with the respective APs 121, 131, and 141. Alternatively, or in addition, any one or more of the nodes 125, 126, 135, 136, 145, and 146 may be a component of and/or be collocated with an aggregation point (not shown) that may service multiple access points, e.g., a plurality of base stations. Similarly, any one or more of the nodes 125, 126, 135, 136, 145, and 146 may be a component of and/or be collocated with a radio network controller of the respective one of the edge clouds 120, 130, and/or 140.

In accordance with the present disclosure, the nodes 125, 126, 135, 136, 145, and 146 may be made available to host client services and may be managed and coordinated by the scheduler 104. For instance, in one example, the nodes 125, 126, 135, 136, 145, and 146 may be configured to receive and respond to requests for availability from the scheduler 104, to provides offers to host client services, to respond to instructions from scheduler 104 to host client services, to obtain images, code, application data, media content, and other data to instantiate and host a client service from scheduler 104 or from one or more network repositories storing such data, to respond to instructions from scheduler 104 to release client services, and so forth. In addition, the nodes 125, 126, 135, 136, 145, and 146 may be configured to interact with client devices, such as devices 111 and 112, in connection with the client service(s) instantiated thereon. For instance, the nodes 125, 126, 135, 136, 145, and 146 may operate as streaming video servers, streaming audio servers, virtual assistant servers, translation servers, and so on. In other words, the client services may comprise various types of servers for interactive and/or streaming applications.

In one example, the nodes 125, 126, 135, 136, 145, and 146 may also comprise network function virtualization infrastructure (NFVI), e.g., for software defined network (SDN) services of an operator of the telecommunication network 102 and/or the system 100 in general, such as virtual mobility management entities (vMMEs), virtual serving gateways (vSGWs), or other virtual network functions (VNFs). In such an example, the service provider VNFs may be logically separated from any client services which may be allowed to be instantiated on the same mobile edge infrastructure. In another example, the nodes 125, 126, 135, 136, 145, and 146 hosting client services may be collocated with, but physically separate from any servers which may comprise NFVI for service provider functions/VNFs.

In one example, each of nodes 125, 126, 135, 136, 145, and 146 may comprise a computing system or server, such as computing system 300 depicted in FIG. 3, and may be configured to provide one or more operations or functions in connection with examples of the present disclosure for selecting a host device of a mobile edge infrastructure of a telecommunication network to host a client service, as described herein. In addition, the scheduler 104 may comprise a computing system or server, such as computing system 300 depicted in FIG. 3, and may be configured to provide one or more operations or functions for selecting a host device of a mobile edge infrastructure of a telecommunication network to host a client service, as described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In a first illustrative example, the scheduler 104 may establish a client service on one of the nodes 125, 126, 135, 136, 145, or 146 as follows. The scheduler may receive a request from device 111 to establish a 360 streaming video server (broadly, a client service). The request may include or may be accompanied by a latency requirement, e.g., less than 20 ms. For instance, a user of the device 111 and/or an application of the device 111 for 360 streaming video may identify this as a latency requirement or a preference that may be conveyed to scheduler 104. The scheduler 104 may then select candidate nodes which may potentially host the client service. For instance, the scheduler 104 may obtain a location of the device 111 and may initially select candidate nodes (host devices), that may be determined to be within 5 miles of the device 111. The location of the device 111 may be provided by the device 111 itself, or the scheduler 104 may obtain the location from a network-based repository, e.g., from a home subscriber server (HSS), an endpoint device location database, or the like. In addition, each of the candidate nodes may also be selected as a candidate node when the respective candidate node satisfies one or more additional criteria, such as a minimum processor capacity, a minimum memory availability, a minimum storage volume, and so forth. In one example, the scheduler 104 may track various parameters indicating availability and resources of the respective nodes 125, 126, 135, 136, 145, and 146. Alternatively, or in addition, the scheduler 104 may store records indicating the overall resources of respective nodes 125, 126, 135, 136, 145, and 146, and may request that the nodes 125, 126, 135, 136, 145, and 146 indicate current availability of such resources in connection with requests to host client services.

Each of the candidate nodes may then be provided with an IP address or other identifiers of device 111 with instructions to ping the device 111 (e.g., to perform round trip time (RTT) tests between the respective candidate nodes and the device 111). In the present example, the candidate nodes may comprise nodes 125, 126, 145, and 146 of edge clouds 120 and 140. Each of the candidate nodes may respond to the scheduler 104 with the ping results. The scheduler 104 may then select one of the candidate nodes that satisfies the latency requirement, e.g., for which half of the measured RTT satisfies the threshold of 20 ms. For instance, in one example, the scheduler 104 may select the candidate node with the least latency. In another example, the scheduler 104 may select the candidate node with the greatest processor and/or memory availability that satisfies the latency requirement.

In another example, the candidate nodes may be provided with the latency requirement and instructions to ping the device 111. Any candidate node that has a ping that indicates that the latency requirement is exceeded may respond to the scheduler 104 that it does not meet the latency requirement, while other nodes that self-measure and determine that the latency requirement is satisfied (along with any other requirements) may respond to the scheduler 104 with an offer to host the client service.

Continuing with the present example, the scheduler may select node 125 when node 125 is determined to satisfy the latency requirement (and any other requirement(s)), and may inform node 125. In one example, scheduler 104 may provide instructions, configuration parameters, application data, media content, or other data that may be required for the node 125 to instantiate and host the client service for device 111. Alternatively, or in addition, the scheduler 104 may instruct node 125 where to retrieve the instructions, configuration parameters, application data, media content, or other data that may be required for the node 125 to instantiate and host the client service for device 111. For instance, one or more network-based repositories may store such information that may be requested by and provided to nodes (e.g., agent nodes/host devices) of the edge clouds 120, 130, and 140, as described herein. In addition, scheduler 104 may notify the device 111 of the node that is selected to host the client service (e.g., node 125), along with any additional information that may be used to connect to the node 125, such as a uniform resource locator (URL), an IP address, an authorization code, an access token, a port, a protocol, etc. The device 111 may then interact with the client service via node 125. For instance, the device 111 may request a streaming 360 video. The node 125 may then stream media content comprising the 360 video, e.g., via the AP 121. In one example, the node 125 may obtain the media content in connection with the instantiation of the client service at node 125. In another example, the node 125 may obtain the media content separately in response to a request for particular media content from the device 111.

In a second illustrative example, the scheduler 104 may establish a client service on one of the nodes 125, 126, 135, 136, 145, or 146 as follows. The scheduler may receive a request from device 112 to establish a translation server (broadly, a client service). For example, a user of device 112 may be meeting with another person who speaks a different language and the translation server may provide a translation service (e.g., in real-time or near-real time, such as without perceptible delay to the user). For instance, the translation service may include a language recognition component, a speech-to-text component, a tokenization component, a semantic concept extraction component, an output speech generator component, and so forth. The request may include or may be accompanied by a distance requirement, e.g., less than 3000 meters. For instance, a user of the device 112 and/or an application of the device 112 for a translation service may identify 3000 meters a distance requirement or a preference that may be conveyed to scheduler 104. The request may additionally include or be accompanied by one or more additional requirements/criteria for the client service, such as a minimum processor capacity, a minimum memory availability, a minimum storage volume, and so forth.

The scheduler 104 may then select candidate nodes which may potentially host the client service. For instance, the scheduler 104 may obtain a location of the device 112 and may initially select candidate nodes (host devices), that may be determined to be within 3000 meters of the device 112. The location of the device 112 may be provided by the device 112 itself, or the scheduler 104 may obtain the location from a network-based repository, e.g., from a home subscriber server (HSS), an endpoint device location database, or the like. In addition, each of the candidate nodes may also be selected as a candidate node when the respective candidate node satisfies one or more additional criteria, such as a minimum processor capacity, a minimum memory availability, a minimum storage volume, and so forth. In one example, the scheduler 104 may track various parameters indicating availability and resources of the respective nodes 125, 126, 135, 136, 145, and 146. Alternatively, or in addition, the scheduler 104 may store records indicating the overall resources of respective nodes 125, 126, 135, 136, 145, and 146, and may request that the nodes 125, 126, 135, 136, 145, and 146 indicate current availability of such resources in connection with requests to host client services.

Each of the candidate nodes may then be provided with a request to confirm availability to host the client service. In the present example, the candidate nodes may comprise nodes 135, 136, 145, and 146 of edge clouds 130 and 140. Each of the candidate nodes may respond to the scheduler 104 with an indication that the candidate node is available, or unavailable to host the client service. In another example, candidate nodes which are unavailable may not respond, thereby indicating unavailability. The scheduler 104 may then select one of the candidate nodes that satisfies the distance requirement (and any other requirement(s)). For instance, in one example, the scheduler 104 may select the candidate node with the shortest distance from device 112. In another example, the scheduler 104 may select the candidate node with the greatest processor and/or memory availability that satisfies the distance requirement.

Continuing with the present example, the scheduler may select node 135 when node 135 is determined to satisfy the distance requirement (and any other requirement(s)), and may inform node 135. In one example, scheduler 104 may provide instructions, configuration parameters, application data, media content, or other data that may be required for the node 135 to instantiate and host the client service for device 112. Alternatively, or in addition, the scheduler 104 may instruct node 135 where to retrieve the instructions, configuration parameters, application data, media content, or other data that may be required for the node 135 to instantiate and host the client service for device 112. For instance, one or more network-based repositories may store such information that may be requested by and provided to nodes (e.g., agent nodes/host devices) of the edge clouds 120, 130, and 140, as described herein. In addition, scheduler 104 may notify the device 112 of the node that is selected to host the client service (e.g., node 135), along with any additional information that may be used to connect to the node 135, such as a uniform resource locator (URL), an IP address, an authorization code, an access token, a port, a protocol, etc. The device 112 may then interact with the client service via node 135. For instance, the device 112 may establish a session with node 135, e.g., via AP 131, to upload an audio stream of the conversation between the user and the other person for which a translation is desired.

It should be noted that the candidate nodes are not necessarily limited to those in edge clouds via which a client device may wirelessly communicate with an access point deployed therein. For instance, in one example, device 111 may be beyond wireless communication range with AP 141. Nevertheless, nodes 145 and 146 in edge cloud 140 may still be considered for deployment of a client service for device 111. For instance, in one example, system 100 may include communication links between edge clouds 120, 130, and/or 140 which bypass the telecommunication network 102 (e.g., a core network). As just one example, APs 121 and 141 may provide a wireless mesh connectivity for devices to access telecommunication network 102, where the mesh connectivity may also be used to provide access to mobile edge infrastructure in edge cloud 140 via edge cloud 120, without transiting via telecommunication network 102. Alternatively, or in addition, the edge clouds 120, 130, and/or 140 may be interconnected via physical links, e.g., fiber optic cable(s), or the like, which may similarly provide access to mobile edge infrastructure for devices that do not necessarily connect via an access point of the respective edge cloud. Thus, for example, the device 112 may establish a session with node 135 that may include a wireless link between device 112 and AP 141, and a link between edge cloud 140 and edge cloud 130, which may comprise a physical link, or a wireless link between AP 141 and AP 131, for instance.

In one example, telecommunication network 102 may provide a service for hosting client services on mobile edge infrastructure to subscribers, e.g., in addition to television, phone, and/or other telecommunication services. In one example, scheduler 104 and nodes 125, 126, 135, 136, 145, and 146 may operate in a distributed and/or coordinated manner to perform various steps, functions, and/or operations described herein. In one example, scheduler 104 may also comprise network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like, additional edge clouds, and so forth. Thus, these and other modifications are all contemplated within the scope of the present disclosure.

Figure 2:
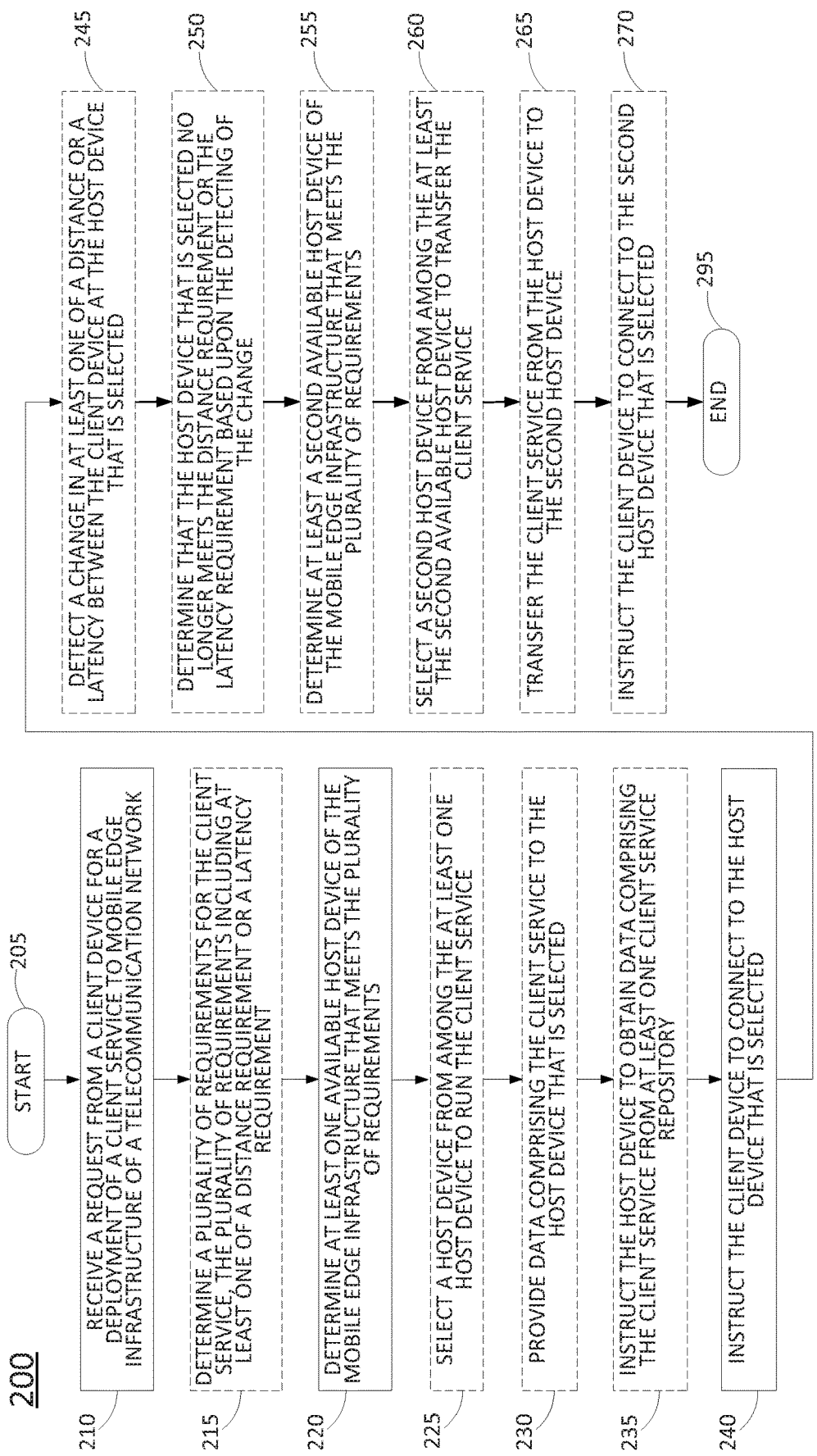
FIG. 2 illustrates a flowchart of an example method for selecting a host device of a mobile edge infrastructure of a telecommunication network to host a client service.

FIG. 2 illustrates a flowchart of an example method 200 for selecting a host device of a mobile edge infrastructure of a telecommunication network to host a client service, in accordance with the present disclosure. In one example, the method 200 is performed by a component of the system 100 of FIG. 1, such as by the scheduler 104 and/or any one or more components thereof (e.g., a processor, or processors, performing operations stored in and loaded from a memory), or by the scheduler 104 in conjunction with one or more other devices, such as one of devices 111 or 112, and/or one or more of nodes 125, 126, 135, 136, 145, or 146, and so forth. In one example, the steps, functions, or operations of method 200 may be performed by a computing device or system 300, and/or processor 302 as described in connection with FIG. 3 below. For instance, the computing device or system 300 may represent any one or more components of a scheduler, node, or endpoint/client device in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At step 210, the processing system receives a request from a client device for a deployment of a client service to a mobile edge infrastructure of a telecommunication network, the mobile edge infrastructure including a plurality of host devices (e.g., agent nodes) for running client services. In various examples, the client service may comprise a server for immersive visual streaming, such as for a video streaming service, an augmented reality service, a virtual reality service, a gaming service, and so forth. In other examples, the client service may comprise a server for a translation service, a virtual assistant service, an object detection and/or recognition service, a facial detection and/or recognition service, and so forth. In one example, the request includes a plurality of requirements (broadly, at least one requirement) for the client service, such as a latency requirement, a distance requirement, a minimum processor capacity, a minimum memory availability, a minimum storage volume, and so on.

In one example, each of the host devices is deployed in one of: a cell site, a cell aggregation site, or a radio network controller (RNC) site. For instance, a host device may be a component of a base station or other access points (e.g., of an eNodeB, HeNB, PeNB, or the like) or co-located with the access point, may be at an aggregation site, e.g., connecting a plurality of base stations or other access points to a core network, and so on. In this regard, in one example, the mobile edge infrastructure is deployed in a radio access network portion of the telecommunication network. In other words, in one example, the mobile edge infrastructure is deployed external to a cellular core network portion of a telecommunication network (e.g., deployed in the eUTRAN portion of an LTE network, or similarly for a 5G network, and so on).

At step 215, the processing system determines a plurality of requirements for the client service, the plurality of requirements including at least one of: a distance requirement, comprising a maximum distance between the client device and a candidate host device for deploying the client service, or a latency requirement, comprising a maximum latency between the client device and the candidate host device for deploying the client service. In one example, step 215 may include accessing a data record that correlates the client service to the plurality of requirements. In another example, step 215 may comprise extracting the plurality of requirements for the client service from the request received at step 210. Additional requirements, may include a minimum processor capacity, a minimum memory availability, a minimum storage volume, and so forth.

At step 220, the processing system determines at least one available host device of the mobile edge infrastructure that meets the plurality of requirements. In an example where the plurality of requirements includes the distance requirement, step 220 may include calculating distances between a location of the client device and locations of candidate host devices from among the plurality of host devices of the mobile edge infrastructure. In such an example, step 220 may further include identifying the at least one available host device from among the candidate host devices when a distance that is calculated between the location of the client device and a location of the at least one available host device is less than the maximum distance. In one example, the candidate host devices comprise host devices of the plurality of host devices which meet one or more additional requirements of the plurality of requirements, such as a minimum processor capacity, a minimum memory availability, a minimum storage volume, and so forth. In one example, the location information of the client device may be obtained from the client device (e.g., in the request or in a separate communication), or from network infrastructure that may store and track client device/user endpoint device locations. In one example, the processing system obtains location information of candidate host devices from a database storing locations of candidate host devices. The database may also include other information, such as compute resources, e.g., CPU, GPU, memory, etc., which may be associated with other requirements of the plurality of requirements. The locations of the client device and of the candidate host devices may be expressed as latitude and longitude coordinates, and the distances may be calculated as the differences between the respective coordinates.

In an example where the plurality of requirements includes the latency requirement, step 220 may include selecting candidate host devices from among the plurality of host devices of the mobile edge infrastructure, and obtaining a respective latency measurement between each of the candidate host devices and the client device. In one example, the at least one available host device may be determined based upon the latency measurements. For instance, one or more of the candidate host devices may be determined to comprise the at least one available host device when the respective the latency measurements are below the latency requirement/threshold. In one example, the processing system may instruct each of the candidate host devices to obtain the latency measurements via a ping, or round trip time (RTT) measurement. For instance, the processing system may provide an IP address or similar identifier of the client device to the candidate host devices. The candidate host devices may then report back to the processing system with the measured latencies.

At step 225, the processing system selects a host device from among the at least one available host device to run the client service. In one example, the selecting the host device from among the at least one available host device is based upon the latency measurements between the candidate host devices and the client device. For instance, the at least one available host device with the lowest latency measurement may be selected. In another example, the at least one available host device having a latency measure that satisfies the latency requirement and which has the most excess capacity may be selected. In another example, the at least one available host device may comprise those candidate host devices that are determined to satisfy the distance requirement (and any other requirement(s)). In one example, the processing system may select the host device having the shortest distance calculation. In another example, the processing system may select a host device that satisfies the distance requirement and which has the greatest spare capacity to apply to the client service.

At optional step 230, the processing system may provide data comprising the client service to the host device that is selected, e.g., application code, input variables, libraries, etc. For instance, the client service may comprise a virtual machine (VM), a container, a microservice, or the like, or may comprise an application composed of a plurality of VMs, containers, microservices, or the like. The client service may also include selected video programs or other content. For example, if the client service comprises a video server, the data comprising the client service may also include a video program to be delivered by the video server (if known at the time of instantiating the client service).

At optional step 235, the processing system may instruct the host device to obtain data comprising the client service from at least one network-based repository. For instance, the processing system may not store the data comprising the client service, but may provide an IP address, URL, or the like directing the host device to the client service repository (e.g., one or more servers and/or storage devices) from which the data comprising the client service may be obtained. In one example, optional step 235 may be performed as an alternative to optional step 230.

At step 240, the processing system instructs the client device to connect to the host device that is selected. For example, the processing system may notify the client device of the host device (e.g., an agent node) that is selected to host the client service, along with any additional information that may be used to connect to the host device, such as a URL, an IP address, an authorization code, an access token, a port, a protocol, etc. The client device may then interact with the client service via the host device. For instance, the client device may request a streaming 360 video from the host device. The host device may then stream media content comprising the 360 video to the client device. For example, the client device may convey data comprising a current pose or view to the client service running on the host device, which may be used by the host device to select a portion of the video content and deliver the selected portion to the client device.

At optional step 245, the processing system may detect a change in at least one of a distance or a latency between the client device at the host device that is selected. For instance, the host device, the client device, or both, may monitor latency on an ongoing basis during a communication session. Alternatively, or in addition, the processing system may continue to monitor the communication session between the client device, and may instruct the host device, the client device, or both to measure and/or report the location of the client device and/or the latency of the session, either periodically or on some other basis.

At optional step 250, the processing system may determine that the host device that is selected no longer meets the distance requirement or the latency requirement based upon the detecting of the change. For example, the processing system may measure the distance by comparing a new location of the client device and the location of the host device and determine that the distance exceeds the distance requirement. Similarly, the processing system may receive a new latency measure at optional step 245 and may determine at optional step 250 that the most recent latency measure exceeds the latency requirement.

At optional step 255, the processing system may determine at least a second available host device of the mobile edge infrastructure that meets the plurality of requirements. For instance, optional step 255 may comprise the same or similar operations as described above in connection with step 220.

At optional step 260, the processing system may select a second host device from among the at least the second available host device to transfer the client service. For instance, optional step 260 may comprise the same or similar operations as described above in connection with step 225.

At optional step 265, the processing system may transfer the client service from the host device to the second host device. In one example, optional step 265 may comprise the same or similar operations as described above in connection with one of optional steps 230 or 235. For instance, the processing system may provide data comprising the client service to the second host device that is selected, or may instruct the second host device where and how to obtain data comprising the client service from at least one client service repository. In one example, optional step 265 may include obtaining state information regarding the session between the client device and the (first) host device, and providing the state information to the second host device to enable the second host device to provide the service to the client device without interruption or loss of information from the perspective of the client device. Alternatively, or in addition, the processing system may instruct the second host device to obtain data comprising the client service from the (first) host device and/or may instruct the (first) host device to provide the data comprising the client service to the second host device.

At optional step 270, the processing system may instruct the client device to connect to the second host device that is selected. For instance, optional step 270 may comprise the same or similar operations as described above in connection with step 240. In one example, the client device may maintain state information regarding a session with the client service and/or the host device, and may provide such state information to the second host device to enable the second host device to seamlessly continue the client service.

Following step 240 or any one or more of optional steps 245-270 the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 210-240 for different client devices and/or different client services, optional steps 245-270 for additional changes in the distance or latency between the client device and a current host device hosting the client service, and so forth. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for selecting a host device of a mobile edge infrastructure of a telecommunication network to host a client service, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for selecting a host device of a mobile edge infrastructure of a telecommunication network to host a client service (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for selecting a host device of a mobile edge infrastructure of a telecommunication network to host a client service (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   receiving, by a processing system including at least one processor, a request from a client device for a deployment of a client service to a mobile edge infrastructure of a telecommunication network, wherein the mobile edge infrastructure comprises a plurality of host devices, wherein the mobile edge infrastructure is deployed in a radio access network portion of the telecommunication network that provides a network connectivity to the client device and that is external to a cellular core network portion of the telecommunication network;
   determining, by the processing system, at least one requirement for the client service, the at least one requirement including
      a distance requirement, comprising a maximum distance between the client device and a candidate host device of the plurality of host devices for deploying the client service;
   determining, by the processing system, at least one available host device of the mobile edge infrastructure that meets the at least one requirement, wherein the determining the at least one available host device comprises:
      calculating distances between a location of the client device and locations of candidate host devices from among the plurality of host devices of the mobile edge infrastructure; and
      identifying the at least one available host device from among the candidate host devices when a distance of the distances that is calculated between the location of the client device and a location of the at least one available host device is less than the maximum distance;
   selecting, by the processing system, a host device from among the at least one available host device to run the client service; and
   instructing, by the processing system, the client device to connect to the host device that is selected.

2. The method of claim 1, wherein the request includes the at least one requirement for the client service, wherein the determining the at least one requirement for the client service comprises extracting the at least one requirement for the service from the request.

3. The method of claim 1, wherein the determining the at least one requirement for the client service comprises:
   accessing a data record that correlates the client service to the at least one requirement.

4. The method of claim 1, further comprising:
   providing, by the processing system, data comprising the client service to the host device that is selected.

5. The method of claim 1, further comprising:
   instructing, by the processing system, the host device that is selected to obtain data comprising the client service from at least one client service repository.

6. The method of claim 1, wherein the candidate host devices comprise host devices of the plurality of host devices which meet one or more additional requirements of the at least one requirement.

7. The method of claim 1, wherein the at least one requirement further comprises a latency requirement, comprising a maximum latency between the client device and the candidate host device for deploying the client service, wherein the determining the at least one available host device further comprises:
   selecting the candidate host devices from among the plurality of host devices of the mobile edge infrastructure; and
   obtaining a respective latency measurement between each of the candidate host devices and the client device.

8. The method of claim 7, wherein the selecting the host device from the at least one available host device is based upon respective latency measurements between the candidate host devices and the client device.

9. The method of claim 7, wherein the candidate host devices comprise host devices of the plurality of host devices which meet one or more additional requirements of the at least one requirement.

10. The method of claim 1, wherein each host device of the plurality of host devices is deployed in one of:
a cell site;
a cell aggregation site; or
a radio network controller site.

11. The method of claim 1, further comprising:
detecting a change in at least one of a distance between the client device and the host device that is selected; and
determining that the host device that is selected no longer meets the distance requirement based upon the detecting of the change.

12. The method of claim 11, further comprising:
determining, at least a second available host device of the mobile edge infrastructure that meets the at least one requirement; and
selecting a second host device from among the at least the second available host device to transfer the client service.

13. The method of claim 12, further comprising:
transferring the client service from the host device to the second host device.

14. The method of claim 13, further comprising:
instructing the client device to connect to the second host device that is selected.

15. The method of claim 1, wherein the client service comprises:
a server for immersive visual streaming.

16. A non-transitory computer-readable medium storing instructions which, when executed by a processing system including at least one processor, cause the processing system to perform operations, the operations comprising:
receiving a request from a client device for a deployment of a client service to a mobile edge infrastructure of a telecommunication network, wherein the mobile edge infrastructure comprises a plurality of host devices, wherein the mobile edge infrastructure is deployed in a radio access network portion of the telecommunication network that provides a network connectivity to the client device and that is external to a cellular core network portion of the telecommunication network;
determining at least one requirement for the client service, the at least one requirement including
a distance requirement, comprising a maximum distance between the client device and a candidate host device of the plurality of host devices for deploying the service;
determining at least one available host device of the mobile edge infrastructure that meets the at least one requirement, wherein the determining the at least one available host device comprises:
calculating distances between a location of the client device and locations of candidate host devices from among the plurality of host devices of the mobile edge infrastructure; and
identifying the at least one available host device from among the candidate host devices when a distance of the distances that is calculated between the location of the client device and a location of the at least one available host device is less than the maximum distance;
selecting a host device from among the at least one available host device to run the client service; and
instructing the client device to connect to the host device that is selected.

17. An apparatus comprising:
a processing system including at least one processor; and
a computer-readable medium storing instructions which, when executed by the processing system, cause the processing system to perform operations, the operations comprising:
receiving a request from a client device for a deployment of a client service to a mobile edge infrastructure of a telecommunication network, wherein the mobile edge infrastructure comprises a plurality of host devices, wherein the mobile edge infrastructure is deployed in a radio access network portion of the telecommunication network that provides a network connectivity to the client device and that is external to a cellular core network portion of the telecommunication network;
determining at least one requirement for the client service, the at least one requirement including
a distance requirement, comprising a maximum distance between the client device and a candidate host device of the plurality of host devices for deploying the service;
determining at least one available host device of the mobile edge infrastructure that meets the at least one requirement, wherein the determining the at least one available host device comprises:
calculating distances between a location of the client device and locations of candidate host devices from among the plurality of host devices of the mobile edge infrastructure; and
identifying the at least one available host device from among the candidate host devices when a distance of the distances that is calculated between the location of the client device and a location of the at least one available host device is less than the maximum distance;
selecting a host device from among the at least one available host device to run the client service; and
instructing the client device to connect to the host device that is selected.

18. The apparatus of claim 17, wherein the request includes the at least one requirement for the client service, wherein the determining the at least one requirement for the client service comprises extracting the at least one requirement for the service from the request.

19. The apparatus of claim 17, wherein the determining the at least one requirement for the client service comprises:
accessing a data record that correlates the client service to the at least one requirement.

20. The apparatus of claim 17, the operations further comprising:
providing data comprising the client service to the host device that is selected.

* * * * *